United States Patent
Sun et al.

(10) Patent No.: US 9,920,186 B2
(45) Date of Patent: Mar. 20, 2018

(54) CROSSLINKED POLYETHYLENE RESIN COMPOSITION

(71) Applicant: LG CHEM, LTD., Seoul (KR)

(72) Inventors: Ka Ram Sun, Daejeon (KR); In Gyu Park, Daejeon (KR); Youn Sun Nam, Daejeon (KR); Young Il Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/786,386

(22) PCT Filed: Mar. 25, 2015

(86) PCT No.: PCT/KR2015/002927
§ 371 (c)(1),
(2) Date: Oct. 22, 2015

(87) PCT Pub. No.: WO2016/080604
PCT Pub. Date: May 26, 2016

(65) Prior Publication Data
US 2016/0340492 A1    Nov. 24, 2016

(30) Foreign Application Priority Data

Nov. 19, 2014  (KR) .................. 10-2014-0161277

(51) Int. Cl.
| | |
|---|---|
| C08K 5/375 | (2006.01) |
| C08J 3/24 | (2006.01) |
| C08K 5/03 | (2006.01) |
| C08K 5/36 | (2006.01) |
| C08L 23/06 | (2006.01) |
| C08K 5/14 | (2006.01) |
| H01B 3/44 | (2006.01) |
| C08K 5/13 | (2006.01) |
| H01B 7/28 | (2006.01) |

(52) U.S. Cl.
CPC .............. *C08K 5/375* (2013.01); *C08J 3/24* (2013.01); *C08K 5/03* (2013.01); *C08K 5/13* (2013.01); *C08K 5/14* (2013.01); *C08K 5/36* (2013.01); *C08L 23/06* (2013.01); *H01B 3/441* (2013.01); *H01B 7/2813* (2013.01); *C08L 2201/08* (2013.01); *C08L 2203/20* (2013.01); *C08L 2205/06* (2013.01); *C08L 2207/066* (2013.01); *C08L 2312/00* (2013.01)

(58) Field of Classification Search
CPC ...................................................... C08K 5/375
USPC .......................................................... 524/333
See application file for complete search history.

(56) References Cited

U.S. PATENT DOCUMENTS

| | | | |
|---|---|---|---|
| 6,231,978 B1 * | 5/2001 | Keogh ............... | C08K 5/01 174/110 PM |
| 2009/0043012 A1 * | 2/2009 | Easter ............... | H01B 3/441 523/173 |
| 2011/0155416 A1 | 6/2011 | Easter | |
| 2013/0331521 A1 | 12/2013 | Funaoka et al. | |
| 2014/0113133 A1 * | 4/2014 | Sun ............... | H01B 3/441 428/375 |

FOREIGN PATENT DOCUMENTS

| | | |
|---|---|---|
| CN | 102604181 A | 7/2012 |
| CN | 103732677 A | 4/2014 |
| KR | 2000-0059868 A | 10/2000 |
| KR | 10-0443872 B1 | 7/2004 |
| KR | 100718022 B1 | 5/2007 |
| KR | 10-0727207 B1 | 6/2007 |
| KR | 10-2011-0020126 A | 3/2011 |
| KR | 10-2013-0028646 A | 3/2013 |
| KR | 101362560 A | 3/2013 |
| KR | 10-2014-0047022 A | 4/2014 |
| KR | 10-1447778 B1 | 10/2014 |
| WO | 2013/022206 A2 | 2/2013 |
| WO | WO 2013/022206 * | 2/2013 |

* cited by examiner

*Primary Examiner* — Doris L Lee
(74) *Attorney, Agent, or Firm* — Dentons US LLP

(57) ABSTRACT

Disclosed is a crosslinked polyethylene resin composition. According to the present disclosure, a crosslinked polyethylene resin composition having general allowance temperature due to excellent heat resistance characteristics, enhanced long-term workability due to superior long-term aging resistance, and water tree inhibition effects similar or better than those of conventional crosslinked polyethylene (XLPE)), and a power cable manufactured from the composition may be provided.

6 Claims, 1 Drawing Sheet

[Fig. 1]
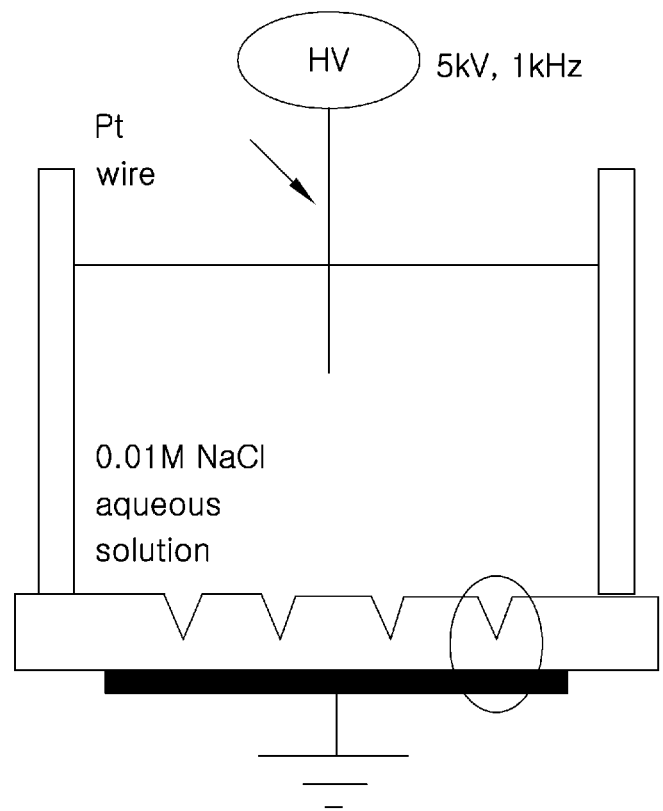
[Fig. 2]
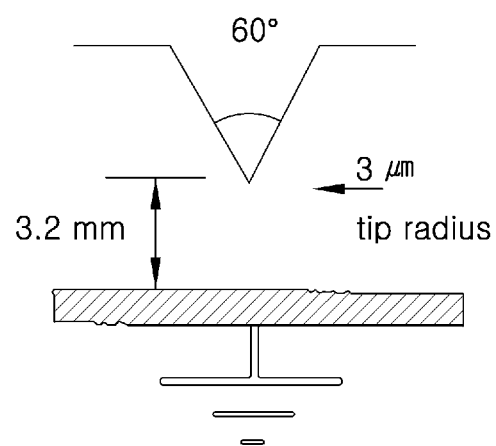

CROSSLINKED POLYETHYLENE RESIN COMPOSITION

This application is a National Stage Entry of International Application No. PCT/KR2015/002927, filed Mar. 25, 2015, which application claims the benefit and priority to Korean Application No. 10-2014-0161277, fled Nov. 19, 2014, both of which are incorporated by reference in their entirety for all purposes as if fully set forth herein.

TECHNICAL FIELD

The present disclosure relates to a crosslinked polyethylene resin composition and a power cable manufactured from the composition. More particularly, the present disclosure relates to a crosslinked polyethylene resin composition having general allowance temperature due to excellent heat resistance characteristics, enhanced long-term workability due to superior long-term aging resistance, and water tree inhibition effects similar or greater than those of conventional crosslinked polyethylene (XLPE)), and a power cable manufactured from the composition.

BACKGROUND ART

Crosslinked polyethylene which has excellent properties of polyethylene as an insulating material and in which a disadvantage of weakness to heat of polyethylene is modified has a three-dimensional network structure unlike linear polyethylene.

Increase of power transmission capacity is required due to increased electricity consumption, but, in crosslinked polyethylene conventionally used for electric insulation of power cables, a general allowance temperature is 90° C. and thus there are limitations in increasing a power transmission capacity.

In addition, in countries such as America and China, medium voltage (MV) cable specifications for each country are being changed to water tree inhibition-type crosslinked polyethylene from general crosslinked polyethylene.

Therefore, there is an urgent need for crosslinked polyethylene having excellent heat resistance characteristics and water tree inhibition effects.

RELATED ART DOCUMENT

Patent Document (Patent Document 1) Korean Patent Application Pub. No. 2011-0020126

DISCLOSURE

Technical Problem

Therefore, the present disclosure has been made in view of the above problems, and it is one object of the present disclosure to provide a crosslinked polyethylene resin composition having general allowance temperature due to excellent heat resistance characteristics, enhanced long-term workability due to superior long-term aging resistance, and water tree inhibition effects similar or better than those of conventional crosslinked polyethylene (XLPE)), and a power cable manufactured from the composition.

The above and other objects can be accomplished by the present disclosure described below.

Technical Solution

In accordance with one aspect of the present disclosure, provided is a crosslinked polyethylene resin composition comprising a) 100 parts by weight of low-density polyethylene (LDPE), b) 0.1 to 10 parts by weight of a crosslinking agent, c) 0.1 to 5 parts by weight of a crosslinking facilitator, d) 0 to 5 parts by weight of a treeing inhibitor, and e) greater than 0.3 parts by weight and 5 parts by weight or less of an antioxidant.

c) The crosslinking facilitator may be one or more selected from the group consisting of, for example, 2,4-diphenyl-4-methyl-1-pentene, 1,4-hydroquinone and hydroquinone derivatives.

e) The antioxidant may be a mixture of, for example, a thiobisphenol-based antioxidant and a thiobispropionate-based antioxidant.

An amount of the thiobisphenol-based antioxidant is, for example, 0 to 5 parts by weight, and an amount of the thiobispropionate-based antioxidant is, for example, 0.01 to 5 parts by weight.

e) The antioxidant may comprise, for example, thiobis[2-tert-butyl-5-methyl-4,1-phenylene]bis[3-(dodecylthio)propionate].

e) The antioxidant might not comprise, for example, a bisthio-based antioxidant.

c) A weight ratio of the crosslinking facilitator to e) the antioxidant may be, for example, 2:1 to 1:2.

The crosslinked polyethylene resin composition may have a crosslinking degree of, for example, 80 to 90%.

The crosslinked polyethylene resin composition may have a hot elongation percentage (230° C., 15 min, 20 N/cm$^2$) of, for example, 40 to 120%.

The crosslinked polyethylene resin composition may have tensile strength after aging of, for example, 190 to 280 kg/cm$^2$ (IEC 811 dumbbell specimen, convection oven at 150° C., 30 days).

The crosslinked polyethylene resin composition may have a water tree inhibition rate of, for example, 10.7 to 15.

The crosslinked polyethylene resin composition may be a crosslinked polyethylene resin composition for, for example, power cable electric insulation.

In accordance with another aspect of the present disclosure, provided is a power cable manufactured from the crosslinked polyethylene resin composition.

Advantageous Effects

As apparent from the foregoing, the present disclosure advantageously provides a crosslinked polyethylene resin composition having general allowance temperature due to excellent heat resistance characteristics, enhanced long-term workability due to superior long-term aging resistance, and water tree inhibition effects similar or greater than those of conventional crosslinked polyethylene (XLPE)), and a power cable manufactured from the composition.

BRIEF DESCRIPTION OF THE DRAWINGS

The above and other objects, features and other advantages of the present disclosure will be more clearly understood from the following detailed description taken in conjunction with the accompanying drawing, in which:

FIG. 1 schematically illustrates an accelerated water tree degradation device for measuring an average tree length according to an embodiment of the present disclosure; and FIG. 2 schematically illustrates a needle inserter for measuring an average tree length according to an embodiment of the present disclosure.

BEST MODE

Hereinafter, a crosslinked polyethylene resin composition and a power cable manufactured from the composition disclosed in the present disclosure are described in more detail.

The crosslinked polyethylene resin composition according to the present disclosure comprises a) 100 parts by weight of low-density polyethylene (LDPE), b) 0.1 to 10 parts by weight of a crosslinking agent, c) 0.1 to 5 parts by weight of a crosslinking facilitator, d) 0 to 5 parts by weight of a treeing inhibitor, and e) greater than 0.3 parts by weight and 5 parts by weight or less of an antioxidant.

a) Low-Density Polyethylene

Low-density polyethylene according to the present disclosure is not specifically limited so long as the low-density polyethylene is low-density polyethylene that may be applied to general cables.

In an embodiment, the low-density polyethylene may be an ethylene homopolymer polymerized through free radical initiation reaction in a high-temperature tubular reactor at 1000 atm (bar) or more or an autoclave reactor, or an ethylene copolymer prepared using a Ziegler-Natta catalyst or a metallocene catalyst under a low pressure of 100 atm (bar) or less.

In an embodiment, the metallocene catalyst may be an organic metal compound formed through ligand-binding of a cyclopentadiene derivative and an element of Group 4b, 5b or 6b, particularly a transition metal such as titanium, zirconium, hafnium or vanadium of Groups 4b and 5b on the periodic table.

In an embodiment, the ethylene copolymer may use α-olefin having a carbon number of 3 or more as a comonomer. In another embodiment, one or more selected from the group consisting of propylene, 1-butene, 1-pentene, 1-hexene and 1-octene may be used as a comonomer.

In an embodiment, the density of the low-density polyethylene may be 0.87 to 0.94 g/cm$^3$, 0.90 to 0.93 g/cm$^3$ or 0.910 to 0.925 g/cm$^3$.

In an embodiment, the low-density polyethylene may have a melt index (MI) of 0.1 to 50 g/10 min, 0.5 to 10 g/10 min or 1 to 5 g/10 min.

The melt indexes (MI) of the present disclosure are values measured at 190° C. under a load of 2.16 kg.

In an embodiment, a weight-average molecular weight of the low-density polyethylene may be 40,000 to 200,000 g/mol, 60,000 to 150,000 g/mol or 70,000 to 130,000 g/mol.

b) Crosslinking Agent

The crosslinking agent according to the present disclosure forms a crosslinking initiation point of low-density polyethylene. In another embodiment, the content of the crosslinking agent may be 1 to 4 parts by weight, 1 to 3 parts by weight or 1 to 2.5 parts by weight. Within these ranges, superior crosslinking characteristics and long-term workability are exhibited.

In an embodiment, the crosslinking agent may be one or more selected from the group consisting of dicumyl peroxide (DCP), benzoyl peroxide, lauryl peroxide, tert-butyl cumyl peroxide, di(tert-butyl peroxy isopropyl benzene), 2,5-dimethyl-2,5-di(tert-butyl peroxy)hexane, and di-tert-butyl peroxide.

c) Crosslinking Facilitator

The crosslinking facilitator according to the present disclosure increases crosslinking efficiencies of a crosslinking agent and enhances scorch resistance. In another embodiment, the content of the crosslinking facilitator may be 0.1 to 1.0 parts by weight, 0.2 to 0.8 parts by weight, or 0.2 to 0.6 parts by weight. Within these ranges, superior crosslinking facilitation and crosslinking efficiencies are exhibited.

In an embodiment, the crosslinking facilitator may be one or more selected from the group consisting of 2,4-diphenyl-4-methyl-1-pentene, 1,4-hydroquinone and hydroquinone derivatives, particularly 2,4-diphenyl-4-methyl-1-pentene.

d) Treeing Inhibitor

In an embodiment, the treeing inhibitor according to the present disclosure may be polyethylene glycol having a number average molecular weight of 5,000 to 70,000 g/mol.

In another embodiment, the content of the treeing inhibitor may be 0 to 2.0 parts by weight, 0.1 to 2.0 parts by weight, or 0.2 to 0.8 parts by weight. Within these ranges, water tree inhibition properties, thermal aging resistance, mechanical properties and economic efficiencies of a cable insulator are superior.

e) Antioxidant

In another embodiment, the content of the antioxidant according to the present disclosure may be greater than 0.3 parts by weight and 2.0 parts by weight or less, 0.4 to 1.0 parts by weight, or 0.4 to 0.6 parts by weight. Within these ranges, long-term aging properties and long-term safety of a cable are superior.

e) In an embodiment, the antioxidant may be a mixture of a thiobisphenol-based antioxidant and a thiobispropionate-based antioxidant. In this case, heat resistance is superior.

In an embodiment, the amount of the thiobisphenol-based antioxidant may be 0 to 5 parts by weight, 0.01 to 2 parts by weight, or 0.1 to 1.0 parts by weight, and, in an embodiment, the amount of the thiobispropionate-based antioxidant may be 0.01 to 5 parts by weight, 0.05 to 2.0 parts by weight, or 0.1 to 1.0 parts by weight. Within these ranges, heat resistance is superior.

e) In an embodiment, the antioxidant may comprise thiobis[2-tert-butyl-5-methyl-4,1-phenylene]bis[3-(dodecylthio)propionate].

e) In an embodiment, the antioxidant might not comprise a bisthio-based antioxidant.

When the antioxidant of the present disclosure, particularly thiobis[2-tert-butyl-5-methyl-4,1-phenylene]bis[3-(dodecylthio) propionate], is used with the crosslinking facilitator, water tree resistance is greatly enhanced with enhancement of crosslinking characteristics and antioxidation effects (synergic effects).

In an embodiment, c) a weight ratio of the crosslinking facilitator to e) the antioxidant may be 8:1 to 1:3, 6:1 to 1:2, or 4:1 to 2:3. Within these ranges, water tree inhibition effects and long-term aging resistance are excellent.

Crosslinked Polyethylene Resin Composition

In an embodiment, the crosslinked polyethylene resin composition may have a crosslinking degree of 80 to 90%, or 82 to 86%. Within this range, the crosslinked polyethylene resin composition is suitable for electric insulation of power cables.

In an embodiment, the crosslinked polyethylene resin composition may have a hot elongation (230° C., 15 min, 20 N/cm$^2$) of 40 to 120%, or 45 to 110%. Within these ranges, the crosslinked polyethylene resin composition is suitable for electric insulation of power cables.

In an embodiment, the crosslinked polyethylene resin composition may have a tensile strength after aging (IEC 811 dumbbell specimen, Convection oven at 150° C., 30 days) of 190 to 280 kg/cm², or 197 to 271 kg/cm². Within these ranges, the crosslinked polyethylene resin composition is suitable for electric insulation of power cables.

In an embodiment, the crosslinked polyethylene resin composition may have a water tree inhibition rate of 10.7 to 15, or 11 to 14.2. Within these ranges, the crosslinked polyethylene resin composition is suitable for electric insulation of power cables.

In an embodiment, the crosslinked polyethylene resin composition may be a crosslinked polyethylene resin composition for power cable electric insulation.

In an embodiment, a method of preparing the crosslinked polyethylene resin composition of the present disclosure may comprise kneading and extruding the compounds of a) to e) according to the present disclosure in the amounts according to the present disclosure; and crosslinking a resultant extrudate at a temperature higher than a decomposition temperature of a crosslinking agent.

The kneading and the extruding are not specifically limited so long as general crosslinked polyethylene resin compositions may be kneaded and extruded. In an embodiment, the kneading and the extruding may be carried out by preparing a master batch including a mixture of an antioxidant and a treeing inhibitor; or a mixture of an antioxidant, a treeing inhibitor and a crosslinking agent, and then inputting the master batch alone or with low-density polyethylene, etc. to an extruder.

In an embodiment, the crosslinking may be carried out by mixing an extrudate (pellet) with the crosslinking agent using a Banbury mixer as a twin-screw kneader, a twin-screw roll mill, etc., and then by compression-molding a resultant mixture at a predetermined temperature for a predetermined time.

The compression-molding is not specifically limited so long as methods, devices and conditions generally used to manufacture crosslinked polyethylene resin composition sheets are used.

In an embodiment, the extruder may be a twin-screw extruder, a single-screw extruder having a kneading function, etc.

The power cable according to the present disclosure is manufactured from the crosslinked polyethylene resin composition of the present disclosure.

Power Cable

In an embodiment, the power cable according to the present disclosure comprises a conductor; an insulating layer enveloping the conductor; a filler and/or a shield layer; and a coating layer. The insulating layer may be formed from the crosslinked polyethylene composition of the present disclosure.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

Example

Raw materials used in Example are as follows.
Low-density polyethylene: Polyethylene having a density of 0.921 g/cm³, a melt index of 2.0 g/10 min and a weight-average molecular weight of 90,000 to 120,000 g/mol (LUTENE® CB2030 manufactured by LG Chem.)
Crosslinking agent: Dicumyl peroxide (DCP)
Antioxidant 1: 4,4'-thiobis(2-t-butyl-5-methylphenol)
Antioxidant 2: 4,6-bis(octylthiomethyl)-o-cresol
Antioxidant 3: Thiobis[2-t-butyl-5-methyl-4,1-phenylene]bis[3-(dodecylthio) propionate]
Treeing inhibitor: Polyethylene glycol Examples 1 to 6 and Comparative Examples 1 to 8

As summarized in Tables 1 and 2 below, each of raw materials except for a crosslinking agent was extruded into a pellet type in a 120 to 140° C. extruder, and then kneaded with a crosslinking agent disclosed in Tables 1 and 2 below in a Banbury mixer. A resultant kneaded mixture was compression-molded at 180° C. for 10 min, thereby manufacturing a crosslinked polyethylene resin composition sheet.

Test Example

Properties of crosslinked polyethylene resin composition sheets manufactured According to Examples 1 to 6 and Comparative Example 1 to 8 were measured according to methods below. Results are summarized in Tables 1 and 2 below. Here, scorch resistance was measured using samples processed such that mixtures kneaded according to Examples 1 to 6 and Comparative Examples 1 to 8 were evenly melted at 120° C.

Crosslinking degree: 0.2 to 0.3 g of a thinly cut specimen was input to a boiling xylene solution and refluxed for 24 hours. Subsequently, the weight of specimen remainder was measured and a crosslinking degree thereof was calculated according to Mathematical Equation 1 below.

[Mathematical Equation 1]

$$\text{Degree of crosslinking}(\%) = \frac{\left(\begin{array}{c}\text{Weight of specimen before treatment} -\\ \text{Weight of specimen after treatment}\end{array}\right)}{\text{Weight of specimen before treatment}} \times 100$$

Hot elongation 1(%): A specimen length change value measured at 200° C./15 min under a load of 20 N/cm² according a method disclosed in IEC 811 was represented by %.
Hot elongation 2(%): A specimen length change value measured at 230° C./15 min under a load of 20 N/cm² according a method disclosed in IEC 811 was represented by %.
Room-temperature tensile strength and elongation: Were measured using a universal testing machine (UTM) according a method disclosed in IEC 811.
Tensile strength after aging (kg/cm²) and elongation (%) 1: Was measured using a universal testing machine (UTM) according a method disclosed in IEC 811 after aging in a 135° C. air oven for 30 days.
Tensile strength after aging (kg/cm²) and elongation (%) 2: Was measured using a universal testing machine (UTM) according a method disclosed in IEC 811 after aging in a 150° C. air oven for 30 days.
Scorch resistance: Was measured at 160° C., an arc of 0.5° and a vibration frequency of 50 rpm for 12 minutes. Time taken to reach to 90% of a maximum toque exhibited by complete crosslinking of a sample was measured and represented as "min" and "sec".

Average tree length: Water tree inhibition characteristics of the present disclosure were evaluated by measuring a water tree growth length according to constant-time (30 days) aging based on ASTM D6097. The water tree length was measured using an accelerated water tree degradation device illustrated in FIG. 1, and a particular test method therefor is as follows. A sample molded into a plate shape was inserted into a needle inserter, into which a conical needle of FIG. 2 may be inserted, at a location of 3.2 mm from an end of the specimen. Subsequently, a crosslinked specimen for water tree measurement was manufactured through pressing at 180° C. Here, an angle of a used needle was 60° and a radius curvature of a tip of the needle was 3 μm. A 0.01 M sodium chloride (NaCl) solution was poured into the specimen manufactured through the process and a 50 mm platinum line was connected thereto. Subsequently, an alternating current voltage of 5 kV was measured for 720 hours. The specimen was thinly cut, and the length of finally elongated water tree thereof was measured using an optical microscope. Here, the measured water tree length is an average value of total specimen values.

Water tree inhibition rate: A water tree length measured according to ASTM D6097 was substituted into Mathematical Equation 2 below and a water tree inhibition rate was calculated.

Water tree inhibition rate=$L/LWT$  [Mathematical Equation 2]

In Mathematical Equation 2, L denotes a distance between a specimen end notch and an opposite surface of the specimen (3.2 mm), and LWT denotes a tree length grown to the opposite surface of the specimen from the specimen end notch.

TABLE 1

| Classification | Example 1 | Example 2 | Example 3 | Example 4 | Example 5 | Example 6 |
|---|---|---|---|---|---|---|
| Low-density polyethylene | 100 | 100 | 100 | 100 | 100 | 100 |
| Crosslinking agent | 2.0 | 2.0 | 2.0 | 2.0 | 2.0 | 2.0 |
| Antioxidant 1 | 0.3 | 0.3 | 0.3 | — | — | — |
| Antioxidant 3 | 0.1 | 0.3 | 0.3 | 0.4 | 0.4 | 0.6 |
| Crosslinking facilitator | 0.4 | 0.4 | 0.4 | 0.4 | 0.4 | 0.4 |
| Treeing inhibitor | 0.5 | 0.5 | — | 0.5 | — | 0.5 |
| Crosslinking degree (%) | 83 | 82 | 83 | 86 | 85 | 82 |
| Hot elongation 1 (%) | 90 | 80 | 85 | 43 | 40 | 35 |
| Hot elongation 2 (%) | 110 | 101 | 105 | 55 | 52 | 45 |
| Room-temperature tensile strength (kg/cm$^2$) | 264 | 270 | 274 | 242 | 247 | 245 |
| Room-temperature elongation (%) | 585 | 595 | 595 | 533 | 550 | 536 |
| Tensile after aging (kg/cm$^2$) | 260 | 265 | 276 | 219 | 230 | 224 |
| Elongation after aging (%) | 581 | 600 | 607 | 502 | 535 | 512 |
| Tensile after aging (kg/cm$^2$) | 255 | 268 | 271 | 197 | 225 | 210 |
| Elongation after aging (%) | 575 | 598 | 602 | 494 | 526 | 503 |
| Scorch resistance (min:sec) | 11:35 | 10:49 | 10:30 | 7:54 | 7:30 | 7:35 |

TABLE 1-continued

| Classification | Example 1 | Example 2 | Example 3 | Example 4 | Example 5 | Example 6 |
|---|---|---|---|---|---|---|
| Average tree length (μm) | 239 | 230 | 275 | 258 | 270 | 225 |
| Water tree inhibition rate | 13.4 | 13.9 | 11.6 | 12.4 | 11.9 | 14.2 |

TABLE 2

| Classification | Comparative Examples | | | | | | | |
|---|---|---|---|---|---|---|---|---|
| | 1 | 2 | 3 | 4 | 5 | 6 | 7 | 8 |
| Low-density polyethylene | 100 | 100 | 100 | 100 | 100 | 100 | 100 | 100 |
| Crosslinking agent | 2.0 | 2.0 | 2.0 | 2.0 | 2.0 | 2.0 | 2.0 | 2.0 |
| Antioxidant 1 | 0.1 | 0.3 | 0.3 | 0.3 | — | — | — | 0.4 |
| Antioxidant 2 | 0.2 | — | 0.1 | 0.1 | — | 0.2 | 0.1 | — |
| Antioxidant 3 | 0.1 | 0.1 | 0.2 | 0.2 | 0.4 | 0.2 | 0.5 | — |
| Crosslinking facilitator | 0.4 | — | — | — | — | 0.4 | — | 0.4 |
| Treeing inhibitor | 0.5 | 0.5 | 0.5 | — | 0.5 | — | 0.5 | 0.5 |
| Crosslinking degree (%) | 85 | 81 | 78 | 79 | 86 | 82 | 83 | 79 |
| Hot elongation 1 (%) | 130 | 100 | 125 | 120 | 58 | 85 | 50 | 120 |
| Hot elongation 2 (%) | break | 120 | break | 180 | 65 | 98 | 59 | break |
| Room-temperature tensile (kg/cm$^2$) | 262 | 263 | 265 | 270 | 251 | 250 | 255 | 245 |
| Room-temperature elongation (%) | 585 | 590 | 595 | 600 | 545 | 558 | 551 | 550 |
| Tensile strength after aging (kg/cm$^2$) | 187 | 261 | 225 | 260 | 196 | 121 | 210 | 221 |
| Elongation after aging (%) | 503 | 595 | 550 | 582 | 417 | 190 | 505 | 505 |
| Tensile strength after aging (kg/cm$^2$) | 105 | 260 | 211 | 246 | Break | Break | 195 | 201 |
| Elongation after aging (%) | 217 | 585 | 520 | 553 | Break | Break | 481 | 480 |
| Scorch resistance (min:sec) | 8:20 | 7:56 | 9:41 | 9:24 | 5:35 | 7:40 | 4:41 | 9:51 |
| Average tree length (μm) | 240 | 255 | 246 | 570 | 260 | 282 | 235 | 241 |
| Water tree inhibition rate | 13.3 | 12.5 | 13.0 | 5.6 | 12.3 | 11.3 | 13.6 | 13.3 |

As shown in Tables 1 and 2, it can be confirmed that the crosslinked polyethylene resin compositions (Examples 1 to 6) according to the present disclosure have excellent heat resistance characteristics and long-term ageing resistance, superior property balance required for insulated cables, equal or greater water tree inhibition effects, compared to conventional crosslinked polyethylene resin compositions.

It can be confirmed that, through comparison of Examples 1 and 2, and Comparative Examples 1 to 3, and 8, high-temperature hot elongation characteristics are decreased when the antioxidant 3 is not used or used with the antioxidant 2 that is generally used as a combination with the antioxidant 3, compared to the case wherein the antioxidant 3 is used alone. In addition, it can be confirmed that, when the crosslinking facilitator is not used, scorch resistance is decreased and thus long-term workability of the cable is decreased.

In addition, it can be confirmed that, through comparison of Examples 3 and 4 and Comparative Examples 4 and 5, aging characteristics are rapidly decreased when the antioxidant 3 and the crosslinking facilitator are not used together, and, in this case, water tree characteristics are decreased when the conventional water tree inhibitor is not used together.

It can be confirmed that, through comparison of Example 5 and Comparative Example 6, aging characteristics are decreased when only the antioxidant 3 is used in an amount of 0.3 parts by weight. In addition, it can be confirmed that, through comparison of Example 6 and Comparative Example 7, scorch resistance is decreased and thus long-term cable workability is rapidly decreased when the antioxidant 3 is used without the crosslinking facilitator.

What is claimed is:

1. A crosslinked polyethylene resin composition consisting of:
    a) 100 parts by weight of low-density polyethylene (LDPE),
    b) 1 to 2.5 parts by weight of a crosslinking agent,
    c) 0.4 parts by weight of a crosslinking facilitator,
    d) 0 to 2 parts by weight of a treeing inhibitor, and
    e) 0.4 to 0.6 parts by weight of an antioxidant, wherein the antioxidant is a mixture comprising 0.3 parts by weight of 4,4'-thiobis(2-tert-butyl-5-methyl-phenol) and 0.1 to 0.3 parts by weight of thiobis[2-tert-butyl-5-methyl-4,1-phenylene]bis[3-(dodecylthio)propionate];
    wherein the crosslinked polyethylene resin composition has a water tree inhibition rate of 11.6 to 13.9,
    wherein the crosslinked polyethylene resin composition has a hot elongation percentage (230° C., 15 mins 20 n/cm$^2$) of 101 to 110%,
    wherein the crosslinked polyethylene resin composition has tensile strength after aging of 260 to 276 kg/cm$^2$ (IEC 811 dumbbell specimen, convection oven at 135° C., 30 days), and
    wherein the crosslinked polyethylene resin composition has a scorch resistance (min:sec) of 10:30 to 11:35.

2. The crosslinked polyethylene resin composition according to claim 1, wherein c) the crosslinking facilitator is one or more selected from the group consisting of 2,4-diphenyl-4-methyl-1-pentene, 1,4-hydroquinone and hydroquinone derivatives.

3. The crosslinked polyethylene resin composition according to claim 1, wherein c) a weight ratio of the crosslinking facilitator to e) the antioxidant is 1:1 to 1:1.5.

4. The crosslinked polyethylene resin composition according to claim 1, wherein the crosslinked polyethylene resin composition has a crosslinking degree of 80 to 90%.

5. The crosslinked polyethylene resin composition according to claim 1, wherein the crosslinked polyethylene resin composition is a crosslinked polyethylene resin composition for power cable electric insulation.

6. The crosslinked polyethylene resin composition according to claim 1, wherein the crosslinked polyethylene resin composition is a crosslinked polyethylene resin composition for power cable electric insulation.

* * * * *